(12) United States Patent
Schwarz et al.

(10) Patent No.: US 7,485,981 B2
(45) Date of Patent: Feb. 3, 2009

(54) AIRCRAFT COMBINATION ENGINES COMPLEMENTAL CONNECTION AND OPERATION

(75) Inventors: Frederick M. Schwarz, Glastonbury, CT (US); Andrew P. Berryann, Manchester, CT (US); Brian M. Fentress, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 159 days.

(21) Appl. No.: 11/801,266

(22) Filed: May 9, 2007

(65) Prior Publication Data
US 2008/0277944 A1  Nov. 13, 2008

(51) Int. Cl.
*F01D 41/00* (2006.01)
(52) U.S. Cl. .............................. 290/52; 290/47; 290/45; 290/51
(58) Field of Classification Search .................. 290/52, 290/54, 47, 38, 51
See application file for complete search history.

(56) References Cited

U.S. PATENT DOCUMENTS 7,309,974 B2 * 12/2007 Sarlioglu et al. .............. 322/47
7,355,367 B2 * 4/2008 Sarlioglu et al. .............. 322/47
7,449,795 B2 * 11/2008 Nelson .......................... 290/52
7,452,181 B2 * 11/2008 Kuroki et al. ................ 415/123

* cited by examiner

*Primary Examiner*—Nicholas Ponomarenko
*Assistant Examiner*—Iraj A Mohandesi
(74) *Attorney, Agent, or Firm*—Kinney & Lange, P.A.

(57) ABSTRACT

A power generation system for propelling, and generating electrical power in, an aircraft, using a gas turbine engine coupled to a turbine starter/generator unit having therein an electrical machine capable of being selected to be alternatively a motor and an electrical power generator and having a coupling shaft extending therefrom to be engaged with the air compressor in the gas turbine engine and further having an interconnection conductor for electrical energization. An internal combustion engine provided as an intermittent combustion engine in the aircraft has an air intake coupled through an air transfer duct connected to the air compressor to allow the transfer of compressed air thereto, and has in connection therewith a supply starter/generator unit with a coupling shaft extending therefrom to be engaged with the intermittent combustion engine power shaft. An interconnection conductor therein for electrical energization is electrically interconnected with the turbine starter/generator unit interconnection conductor.

20 Claims, 1 Drawing Sheet

AIRCRAFT COMBINATION ENGINES COMPLEMENTAL CONNECTION AND OPERATION

CROSS-REFERENCE TO RELATED APPLICATIONS

Referenced herein are U.S. application Ser. No. 11/713,262 filed Mar. 2, 2007 for "COMBINATION ENGINES FOR AIRCRAFT" by Frederick M. Schwarz, Brian M. Fentress, Andrew P. Berryann, Charles E. Lents and Jorn A. Glahn; and U.S. application Ser. No. 11/801,270 filed on even date herewith for "AIRCRAFT COMBINATION ENGINES INLET AIRFLOW CONTROL SYSTEM" by Frederick M. Schwarz, Brian M. Fentress, Andrew P. Berryann, Jorn A. Glahn and Charles E. Lents.

BACKGROUND

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines once having been started, often by an electrical starter typically coupled to the engine high compression compressor and supplied electrical power from an auxiliary power unit, generate large thrusts for propulsion, or large horsepower for engines with an output shaft. They do so by combining large volumes of air with large amounts of fuel, and thereby form a jet of large velocity leading to the capability to provide desired speedy flights.

In addition to providing thrust, such gas turbine engines have coupled to integrated drive generators to operate them to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for much larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly, which can severely limit the length of otherwise long duration uses, and also brings those engines closer to becoming operationally unstable.

One alternative to using the gas turbine engine as the sole source of power to operate an electrical power generator is to add in the aircraft a further intermittent combustion internal combustion engine, such as gasoline engines operating on the any of the Diesel, Miller, Otto or Wankel cycles. Such engines can operate with a fuel efficiency on the order of seventy percent (70%) better than that of a continuous combustion (Brayton cycle) internal combustion gas turbine engine. At high altitudes, internal combustion engines of all kinds face the problem of limited power output because of the relatively small air pressures there limiting the chemical reactions of oxygen with hydrogen and oxygen with carbon in the burning of the engine fuel in the engine combustion chamber or chambers. This can be solved for gas turbine engines by providing therein very large air flows through use, typically, of axial flow compressors usually in two stages with both a low compression compressor followed along the fluid flow path through the engine by a high compression compressor. This arrangement provides at least enough compressed air to the subsequent combustor to sustain the desired combustion process therein and a mass of airflow sufficient to combine with enough fuel to provide the energy needed to overcome the aircraft drag at the speed and altitude intended for operation.

However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. Thus, this intermittent combustion engine can be operated at the same relatively high altitudes at which the gas turbine engine propelling the aircraft operates while this turbine engine is also supplying compressed air to that intermittent combustion engine. There, depending on the values selected for the peak air intake pressure and engine compression ratio, the intermittent combustion engine can be used as a power source for an electrical power generator that can generate much greater amounts of electrical power than can one powered by a gas turbine engine.

Although such large amounts of electrical power are needed in operating various devices in the aircraft, they are usually fully or substantially needed only during certain portions of a flight, and are much less needed during other flight portions thereby idling the internal combustion engine during those portions. Such an intermittent combustion engine can be put to a further use in an aircraft of the kind that has the gas turbine engine used therein positioned within walls thereabout of a duct with the inlet side of that duct curved to follow a sinuous path to hide the front of that engine from impinging electromagnetic radiation at various wavelengths such as in a stealth type military aircraft (several kinds of which are unmanned aircraft). Typically, much of the inlet duct portion has a cross sectional area more closely approximating an elliptical shape rather than round so that the desired curves in the duct along its extent can be completed over a shorter extent distance, and then the duct cross section changes to being more round at the gas turbine engine location to accommodate that engine. The amount, or sharpness, of the curvature of the inlet portion of the duct, reflected in the curvature of the curve of cross sectional symmetry of that duct along its extent, resulting from the need to achieve the desired hiding of the front of the gas turbine engine depends on the space available for the duct in the aircraft and the size of that engine. That is, the length, L, of the duct curve of cross sectional symmetry from the duct opening to the atmosphere, on one end thereof, to the front of the gas turbine engine on the other end, and the diameter, D, of the front of that engine provide in their ratio L/D a parameter indicative of the curvature of the inlet portion of the duct, and so the compactness of this convoluted duct part and how extreme must be the resulting directional turning of airflows therethrough.

Relatively slow aircraft speeds at which there is little ram effect forcing air into the inlet duct portion such as occur after takeoff of the aircraft from a runway, followed by relatively sharp climb angles with respect to the aircraft flight direction, and the like, lead to separation or separations of the air flows in this inlet duct from the walls of that duct at locations therein just past the relatively sharp curves occurring in this duct in the direction of extent thereof. Regions of such flow separations from the duct walls extending to the gas turbine engine such as a turbofan engine can lead to stalling of the engine fan or cause individual fan blades to flutter and then structurally fail before the aircraft reaches speeds sufficient for the air entering the inlet duct portion to reach such ram pressures as to prevent these separations. Different ratios L/D for the inlet duct portion in aircraft having engines positioned in a duct will lead to different duct path turning angles and turning radii occurring therealong especially at those duct locations just before and past relatively sharp curves in the duct path. Air flow separations inwardly just past these curves will be less likely with less duct curvature along the duct path but reducing curvature may also negatively affect the positioning of the gas turbine engine in the aircraft. Thus, such duct curvature may nevertheless be required along with any of the likely air flow separations at these locations having to be tolerated.

During takeoff from a runway of an aircraft containing such a gas turbine engine and intermittent combustion engine and the following climb to gain altitude, this intermittent combustion engine is unlikely to be needed to provide torque to an electrical generator for the purpose of its generating large amounts of electrical power while still near that runway. In this portion of the flight, relatively slow aircraft speeds occur leading to the result that air is not forced with substantial pressure (ram pressure) into the inlet of the inlet portion of the duct in which the gas turbine engine is positioned. In this circumstance, often compounded by the relatively sharp climb angles with respect to the aircraft flight direction used after takeoff to gain altitude, the separations of the air flows in this inlet duct from the walls of that duct at locations therein just past the relatively sharp curves provided in this duct can occur as indicated above.

Thus, the intermittent combustion engine is available in at least this part of the flight to aid in preventing such separations without having to be sized sufficiently to provide concurrently both such aid and torque to electrical generators. This engine can do so by establishing a reduced pressure at the potential separation locations during this part of the flight by drawing air through openings located there to help force the duct flows to remain flowing along these portions of the duct walls. Other uses of the intermittent combustion engine to more fully employ it in the aircraft and to provide some reserve against its in-flight failure are also desired.

SUMMARY

The present invention provides a power generation system for propelling, and generating electrical power in, an aircraft, using a gas turbine engine in an engine compartment in the aircraft with an air inlet in the aircraft open to the atmosphere and an inlet duct with a duct wall thereabout that is curved along its extent in extending from the air inlet along a curved path leading to an air compressor in the gas turbine engine followed therein by a combustor, the air compressor having a compressor air transfer duct extending therefrom so as to be capable of providing compressed air therein and to the combustor. In connection with this gas turbine engine, there is also provided a turbine starter/generator unit having therein an electrical machine capable of being selected to be alternatively a motor and an electrical power generator and having a coupling shaft extending therefrom to be engaged with the air compressor in the gas turbine engine and further having an interconnection conductor for electrical energization. An internal combustion engine provided as an intermittent combustion engine in the aircraft has an air intake coupled to combustion chambers therein, a rotatable chamber shaft also coupled to those combustion chambers for generating force, and a fuel system for providing fuel to those combustion chambers, the compressor air transfer duct being connected to the air intake to transfer compressed air thereto. This intermittent combustion engine has in connection therewith a supply starter/generator unit having therein an electrical machine capable of being selected to be alternatively a motor and an electrical power generator and has a coupling shaft extending therefrom to be engaged with the chamber shaft. An interconnection conductor therein for electrical energization is electrically interconnected with the turbine starter/generator unit interconnection conductor.

DETAILED DESCRIPTION

Figure 1:
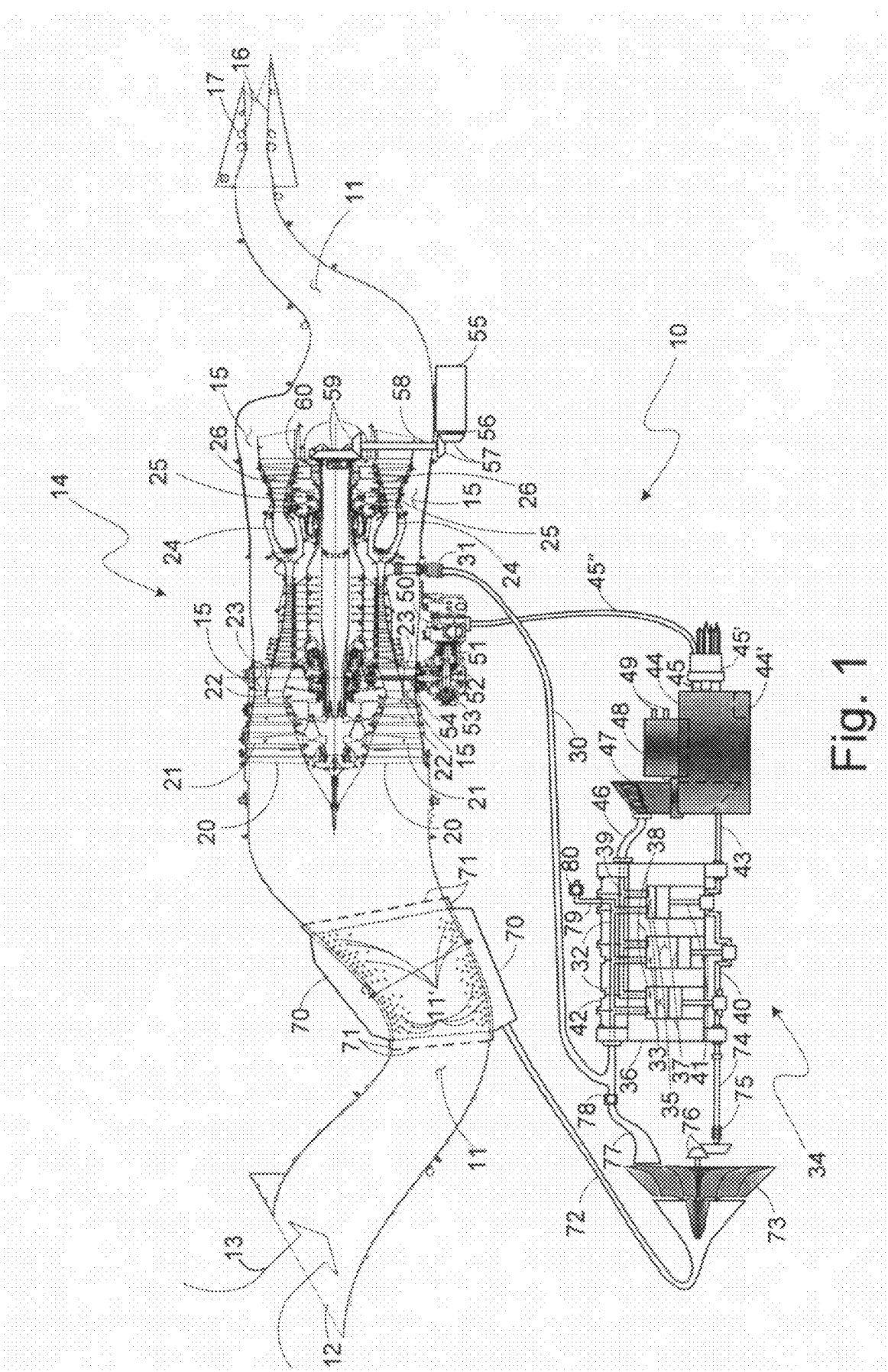
FIG. 1 is a schematic representation of a cross section side view of a portion of an aircraft embodying the present invention.

As indicted above, the intermittent combustion engine is available during takeoff from a runway of an aircraft containing such a gas turbine engine and intermittent combustion engine and the following climb to gain altitude for uses other than rotating a generator rotor to generate large amounts of electrical power. One such use described is the aiding in preventing separations of air flows in the inlet duct from the walls of that duct without having to be sized sufficiently to both provide concurrently such aid and torque to electrical generators. Even before takeoff, however, the intermittent combustion engine is available to be used to start the gas turbine engine in the aircraft, and so to obviate the need for an auxiliary power unit, if the intermittent combustion engine is large enough already to do so because of the capacity required therefor to provide sufficient torque to the primary electrical generator for maximum electrical power needs. That is, the ratio provided by the air flow rate through gas turbine engine divided by the air flow rate through the intermittent combustion engine, representing the ratio of the basic horsepowers of these two engines, cannot be too large.

Thus, with this test of engines power proportions satisfactorily met, a starter/generator unit arrangement can be used in which the electrical machine therein can serve, through suitable controls and switches, both as a) a motor, to be the starter for the intermittent combustion engine, and as b) an electrical power generator to provide the primary electrical power generator for the aircraft to which is supplied torque for generating aircraft electrical power by operating the intermittent combustion engine. Hence, the gas turbine engine can have sufficient electrical power provided to its electrical starting motor from this primary electrical generator to enable this starting motor to start that turbine engine operating. This intermittent combustion engine starter/generator unit arrangement can be self-starting capable, with a sufficiently capable storage battery being provided from which the starter motor can draw enough electrical power to start that intermittent combustion engine.

Such an arrangement alone, however, leaves the aircraft subject to power failure, and possibly crashing, for lack of electrical power to operate its control systems and other devices therein should the intermittent combustion engine or the primary electrical generator fail. Thus, instead of providing just an electrical starting motor for the gas turbine engine for the starting thereof, a second starter/generator unit arrangement can be provided instead having therein an electrical machine that can serve, again through suitable controls and switches, both as a) an electrical motor to be the starter for the gas turbine engine, and as b) an electrical power generator to provide a secondary electrical power generator for the aircraft. This system allows operation of the gas turbine engine to supply torque to this backup electrical generator as a basis for it generating some electrical power when the primary generator operated by torque from the intermittent combustion engine comes to supply electrical power only below a selected threshold for a selected time. This secondary electrical power generator must be sized sufficiently to provide enough electrical power to operate the control systems in the aircraft and whatever else is necessary to allow that aircraft to return to a desired location upon the aircraft control system or systems sensing a failure in the intermittent combustion engine or the primary electrical generator. A clutch arrangement can be provided to allow the electrical power generator of the gas turbine engine starter/generator unit to be decoupled from the gas turbine engine so that it suffers no loss of thrust by generating electrical power when not needed because of then being more efficiently supplied by the primary electrical power generator.

Thus, there is described below an aircraft propulsion and electrical power supply system for starting the operation of a gas turbine engine, here a turbofan engine, while the aircraft in which it is positioned is on the ground using an intermittent combustion engine. Thereafter, this latter engine in the system is used in reducing air pressure at the duct walls curved to follow the path through the inlet portion of the engine duct to thereby aid in preventing airflow separations from those walls at or past the curves in that duct portion. This pressure reduction occurs during times when the aircraft is flying relatively slowly and at angles with respect to its direction of motion, a situation usually occurring while the aircraft is gaining altitude typically while more or less in the vicinity of the aircraft takeoff location. At desired altitudes, such pressure reduction at the duct walls is not needed because of the much greater pressure of the incoming air in the duct keeping the airflow moving along those walls, and so the system is free to turn its resources to propelling the aircraft and generating electrical power as needed or desired. However, should the intermittent combustion engine or the generator operated by it fail, the turbofan engine can operate a secondary electrical power generator for generating backup electrical power to help get the aircraft back to a desired, or acceptable, location.

FIG. 1 shows a schematic representation of a cross section side view of a portion of an aircraft with an example of such a gas turbine engine and intermittent combustion engine combination, 10, in an arrangement in which most of the aircraft structure in which they are positioned has been omitted from this view. However, there is at least a portion of an engine duct, 11, in that aircraft that is shown having openings, or perforations, 11', in a portions of the walls thereof and further having an air inlet, 12, facing forward in the aircraft. The configuration shown for duct 11, with its somewhat sinuous shape, is from a stealth type military aircraft, several kinds of which are unmanned aircraft. This duct first curves downward, coming from the front of the aircraft at the duct opening provided by air inlet 12 to the atmosphere from which an airstream, 13, is drawn. The duct then curves upward to open to a gas turbine engine provided as a turbofan engine, 14, in engine duct 11 which uses airstream 13 for combustion and for fan forced air propulsion purposes. This passageway curvature of duct 11 past air inlet 12 serves to hide the front of engine 14 from impinging electromagnetic radiation at various wavelengths that could be reflected. Perforations 11' are located primarily in the upper and lower portions of the duct wall just past the point of maximum curvature of the duct on the engine 14 side. Outer portions, 15, of duct 11 adjacent engine 14 past a splitter convey the fan forced air provided by engine 14 for propulsion purposes into the remainder of duct 11 past engine 14 toward the outlet of duct 11 to the atmosphere as will be described below.

This fan forced air and the combustion products resulting from combustion in engine 14 are forced out of the remainder of engine duct 11 to an exit nozzle, 16, serving as the outlet of duct 11. A fluid actuation system, 17, provides the force to partial open and close nozzle 16 during the operation of turbofan engine 14. Again, duct 11 past engine 14 first curves downward, coming from that engine, and then the duct curves upward to open to nozzle 16. Here, too, this passageway curvature of duct 11 past engine 14 serves to hide the rear of engine 14 from electromagnetic radiation at various wavelengths impinging at the rear of the aircraft.

Engine 14 has an air inlet guide vane, 20, followed by a high pressure fan, 21, as the fan for the turbofan engine to force air outside and past a splitter, 22, and then through duct portions 15 into the rear of duct 11 and out of that duct through nozzle 16 to exit to the atmosphere. In addition, high pressure fan 21 also serves as a low pressure air compressor through delivering compressed air inside splitter 22 to a high pressure air compressor, 23. The compressed air from high pressure compressor 23 arrives at a combustor, 24, to which fuel is also delivered and burned. The combustion products form a jet of fluid which impinges first on a high pressure turbine, 25, and then on a low pressure turbine, 26, to cause them to rotate which, through appropriate mechanical linkings, leads to high pressure compressor 23 and high pressure fan 21 being forced thereby to also rotate. The combustion products then reach the remainder of duct 11 past engine 14 to exit through nozzle 16 to the atmosphere.

A compressed air conveyance duct, 30, is connected at one end into turbofan engine 14 to receive compressed air from high pressure compressor 23 through a compressed air flow control valve, 31, typically controlled by a system computer or controller (not shown but typically an engine control computer or an aircraft systems computer either eliminating the need for such an engine control computer or operating with it in a distributed control system), and used to control the flow of compressed air from high pressure compressor 23 through duct 30. The opposite end of duct 30 is connected to an air intake, or intake manifold, 32, leading to engine air intake valves, 33, for an intermittent combustion engine, 34, represented in the example of FIG. 2 as a Diesel or Otto cycle engine. Intermittent combustion engine 34 is shown positioned forward in the aircraft of turbofan engine 14 to shift the center of mass of the aircraft forward to counter some of the weight of engine 14 but other positions are possible to be used if desired.

Valves 33 in engine 34 control the air taken into combustion chambers, 35, bounded by an engine block, 36, providing the basic structure of engine 34 and by pistons, 37. Each chamber also has an exhaust valve, 38, through which combustion products are exhausted to an exhaust manifold, 39. A rotatable crankshaft, 40, has a connecting rod, 41, rotatably coupling it to a corresponding one of each of pistons 37. A rotatable camshaft, 42, is used to open and close air intake valves 33 and exhaust valves 38 in a suitable sequence.

Crankshaft 40, under the control of a system controller not shown, is rotated by the force on pistons 37 transmitted thereto by corresponding ones of connecting rods 41 due to repeated combustion events in the corresponding combustion chamber 35 which events occur in all of chambers 35 in a suitable sequence before repeating. These events correspondingly use the air quantities taken through valves 33 repeatedly into, and the fuel quantities repeatedly injected into, those chambers for combustion. The fuel quantities are injected by a fuel injection system not seeable in this figure and the magnitudes thereof are used to select the mechanical power output of crankshaft 40 of the intermittent combustion engine. The resulting combustion products are correspondingly repeatedly rejected from those chambers through valves 38. If an Otto cycle engine is used as intermittent combustion engine 34, the combustion events are initiated by the repeated sparkings of spark plugs not shown in this figure in a suitable sequence across combustion chambers 35 under the control of the system controller. In addition, intermittent combustion engine 34 has a cooling system not shown for cooling the engine structure about combustion chambers 35.

The rotation of crankshaft 40 is suitably fastened to a coupling shaft, 43, of a starter/generator unit arrangement, 44, having an electrical machine therein that operates, through suitable controls and switches operated by the system controller (not shown), both as a) a motor, to be the starter for intermittent combustion engine 34 by drawing electrical power from a battery in the unit, and as b) a primary electrical power generator for the aircraft, and to which is supplied torque for generating that aircraft electrical power by the operation of intermittent combustion engine 34 after it has been started. Arrangement 44 is made self-starting capable by providing therein a storage battery, 44', from which the electrical machine operated as a starter motor can draw enough electrical power to start operation of intermittent combustion engine 34. The resulting rotation of coupling shaft 43 in arrangement 44 operated as an electrical power generator electrically energizes output electrical conductors, 45, of arrangement 44 to thereby generate the desired electrical power thereat for operating aircraft devices (not or not all shown) connected thereto through a cable connector, 45', and the cables extending therefrom shown only partially except for one such cable, 45". The demand for electrical power in the aircraft is used as a basis to select the fuel quantities injected in the combustion chambers of the intermittent combustion engine to have that engine supply sufficient mechanical power crankshaft 40 to sufficiently rotate input shaft 43 of generator 44 to meet that demand.

An exhaust duct, 46, extends from exhaust manifold 39 of intermittent combustion engine 34 to an exhaust turbine, 47, to result in the combustion products of engine 34 impinging on the blades of that turbine to thereby cause it to rotate. A central shaft of this exhaust turbine is coupled to an input shaft of a secondary electrical power generator, 48. The resulting rotation of this input shaft electrically energizes output electrical terminals, 49, of generator 48 to thereby generate the further desired electrical power thereat.

Turbofan engine 14 has a starter/generator unit arrangement, 50, having therein an electrical machine that operates, again through suitable controls and switches operated by the system controller (not shown), both as a) an electrical motor to be the starter for that turbofan engine by drawing electrical power from the primary electrical power generator in arrangement 44 through cable 45" connected thereto, and as b) an electrical power generator to provide a secondary electrical power generator for the aircraft thereby allowing the operation of the gas turbine engine to supply torque to this backup electrical generator as a basis for it generating some electrical power. To be suitable as a backup electrical power generator, this secondary electrical power generator must have sufficient capacity to provide enough electrical power to operate the control systems in the aircraft and whatever else is necessary to allow that aircraft to return to a desired location upon the aircraft control system or systems sensing a failure in the intermittent combustion engine or the primary electrical generator. This function is invoked by the system controller following determination that the intermittent combustion engine starter/generator unit arrangement 44 operated as an electrical power generator following aircraft takeoff and climb to the desired altitude has come to supplying electrical power in amounts below a selected threshold for a selected duration. In addition, this secondary electrical power generator can be operated by the system controller infrequently for short periods on an as needed basis to provide supplemental electrical power at peaks of demand therefor in the aircraft. This provides the basis for reducing the capacity and so the size of the intermittent combustion engine from what it would have to be to have the capacity to handle even the most infrequent electrical power demand peaks.

When being used as a starter under the direction of the system controller, the electrical machine in arrangement 50 is operated as a motor supplied with electrical power by the primary electrical power generator in arrangement 44 through cable 45" and rotates high pressure air compressor 23 to start turbofan engine 14. Thereafter, with turbofan engine 14 operating, this compressor can, under the direction of the system controller, selectively rotate the rotor in arrangement 50 to cause what was the starter motor to instead be operated as a secondary electrical power generator for providing backup electrical power to at least some of the systems in the aircraft (not shown).

Starter/generator unit arrangement 50 has a coupling shaft, 51, extending from the rotor therein to a set of bevel gears, 52, with the bevel gear on the opposite side of this set rotatably coupled to a clutch, 53. Clutch 53 allows the system computer to engage and disengage starter/generator unit arrangement 50 as appropriate. The opposite side of clutch 53 has a engagement shaft, 54, extending therefrom ending in bevel gear rotatably engaged with a counterpart bevel gear in a portion of high pressure air compressor 23.

A further supplemental electrical power generator, 55, is shown in FIG. 1 for this example which has an input shaft, 56, extending from the rotor therein to a set of bevel gears, 57, with the bevel gear on the opposite side of this set rotatably coupled to a shaft, 58, which in turn is coupled to a further set of bevel gears, 59. These bevel gears are coupled to an output shaft of low pressure turbine 26 through a clutch, 60. Clutch 60, here too, allows the system computer to engage and disengage generator 55 as appropriate.

Intermittent combustion engine 34, in establishing a reduced pressure at locations in the inlet portion of duct 11 just past the relatively sharp curves provided in this duct, draws air through openings, or perforations, 11' located there to help force the duct flows to remain flowing along these portions of the duct walls as indicated above. In the distribution of perforations 11' in the walls of the inlet portion of duct 11 for this purpose on the turbofan engine side of the location of the major curve in the path followed by that duct, the greatest densities of those perforations are provided in the walls of the duct at the intersections of duct 11 and a plane projected there through the centerline of that duct. This plane is oriented such that those intersections have the greatest curvature out of those among the various possible intersections. In FIG. 1, those are the portions of duct 11 at the top and bottom thereof on the engine 14 side of the curves in that duct as it is curving along its path in the plane of that figure as this is where flow separations are most likely to occur. The density of perforations 11' diminishes at locations away from the top and bottom locations of maximum perforation densities along peripheral paths over sides of duct 11 between the maximum perforation density locations.

Thus, in FIG. 1, to enable intermittent combustion engine 34 to reduce pressure at the locations of these perforations 11', a partially cut away manifold, 70, is provided shown girdling the input portion of duct 11 so as to be more or less sealed to that duct such that perforations 11' all open from the inside of the duct to the space enclosed by manifold 70 in being sealed to the inlet portion of duct 11. The sealing of manifold 70 to the inlet portion of duct 11 is provided at flanges, 71, extending at the sides of manifold 70 parallel to the outer surface of the duct walls adjacent thereto with a suitable sealing and fastening means. An inlet draw duct, 72, extends at its inlet end from manifold 70 to a flared output end thereof provided adjacent to the fluid drawing side of a blower, 73.

The rotor in blower 73 on which the blower blades are mounted is selectively rotated by intermittent combustion engine 34 through an extension shaft, 74, suitably fastened to crankshaft 40 that engine. Extension shaft 74 is coupled to the blower rotor through a clutch, allowing this rotor to be disengaged from engine 34 under control of the system computer when the blower is not needed, and then through a pair of bevel gears, 76, to increase the rotational speed of the rotor beyond that of crankshaft 40. The air flow through blower 73, either when the rotor thereof is being rotated by engine 34 or not, is received in the flared input end of a coupling duct, 77, in which it is conveyed through a backflow elimination valve, 78, when open to emerge at the output end of duct 77 where it merges with compressed air conveyance duct 30 just ahead of its connection to air intake, or intake manifold, 32 of intermittent combustion engine 34. However, when compressed air from high pressure compressor 23 is selected to be provided through compressed air flow control valve 31 from high pressure compressor 23 through duct 30 to intake manifold 32 of engine 34, valve 78 is closed to prevent that compressed air from being forced through perforations 11' into the inlet portion of duct 11.

The magnitude of the required air flow through perforations 11' from the inlet portion of duct 11 can in some circumstances be as large as 3 to 5% of the total airflow through turbofan engine 14, and this is why blower 73 is provided to supplement the airflow through intake manifold 32 that results from just operating intermittent combustion engine 34 alone. The system computer receives information from appropriate aircraft and engine sensors (not shown) such as the input and output pressure ratio of high pressure compressor 23 or its rotor rotational speed as an indicator of the power being delivered by turbofan engine 14, air temperature, altitude, climbing or descending aircraft angle of attack, or landing gear being down as an indication of an imminent change in the descending angle of attack. From such information, the system computer determines the need for drawing air through perforations 11' from the inlet portion of duct 11 to prevent flow separations from the walls of the inlet portion of that duct past its major curve, and the magnitude thereof needed.

Thus, the system computer can determine that the airflow through intake manifold 32 that results from operating engine intermittent combustion engine 34 alone is sufficient at some operational rotational rate of that engine which the computer selects by controlling the amount of fuel supplied to be injected by the fuel injection system (not shown) for that engine. If the system computer determines that the maximum practical airflow through perforations 11' forced in this manner is insufficient, that computer causes clutch 75 to engage blower 73 to substantially increase that airflow. If the resulting airflow is greater than can be accommodated by the air intake through intake manifold 32, engine air intake valves 33, combustion chambers 35, exhaust valves 38, and exhaust manifold 39, a relief duct, 79, extending from intake manifold 32 conveys the excess through a relief valve, 80, which is caused to be opened by the system computer after determining such a condition exists. This excess airflow is then vented thereby to the atmosphere. Although not shown, the output side of relief valve 80, rather than merely venting the excess airflow to the atmosphere, could be connected by a duct to a variable opening nozzle controlled by the system computer to result in the excess airflow providing additional thrust for the aircraft.

Although the present invention has been described with reference to preferred embodiments, workers skilled in the art will recognize that changes may be made in form and detail without departing from the spirit and scope of the invention.

The invention claimed is:

1. A power generation system for propelling, and generating electrical power in, an aircraft, the system comprising:
a gas turbine engine in an engine compartment in the aircraft having an air inlet open to the atmosphere, an air compressor, a combustor, a turbine and an exhaust exit nozzle open to the atmosphere all positioned along a fluids flow path passing therethrough for generating force, the air compressor having a compressor air transfer duct extending therefrom so as to be capable of providing compressed air therein and to the combustor;
a turbine starter/generator unit having therein an electrical machine capable of being selected to be alternatively a motor and an electrical power generator and having a coupling shaft extending therefrom to be engaged with the air compressor in the gas turbine engine and further having an interconnection conductor for electrical energization;
an internal combustion engine provided as an intermittent combustion engine in the aircraft having an air intake coupled to combustion chambers therein, a rotatable chamber shaft also coupled to those combustion chambers for generating force, and a fuel system for providing fuel to those combustion chambers, the compressor air transfer duct being connected to the air intake to transfer compressed air thereto, and
a supply starter/generator unit having therein an electrical machine capable of being selected to be alternatively a motor and an electrical power generator and having a coupling shaft extending therefrom to be engaged with the chamber shaft and further having an interconnection conductor for electrical energization that is electrically interconnected with the turbine starter/generator unit interconnection conductor.

2. The combination of claim 1 wherein the turbine starter/generator unit has its interconnection conductor electrically energized by the supply starter/generator unit when the electrical machine in the turbine starter/generator unit is being operated as a motor, and has its interconnection conductor electrically energized by the air compressor in the gas turbine engine rotating its coupling shaft when the electrical machine in the turbine starter/generator unit is being operated as an electrical power generator.

3. The combination of claim 1 wherein the supply starter/generator unit has its interconnection conductor electrically energized by a battery when the electrical machine in the supply starter/generator unit is being operated as a motor, and has its interconnection conductor electrically energized by the intermittent combustion engine rotating its coupling shaft when the electrical machine in the supply starter/generator unit is being operated as an electrical power generator.

4. The combination of claim 1 further comprising a compressor control valve at least partially in the compressor air transfer duct which can be selectively directed to open more or close more to thereby selectively affect the passage of compressed air through the compressor air transfer duct.

5. The combination of claim 1 wherein the aircraft with gas turbine engine in the engine compartment therein has, from the air inlet in the aircraft open to the atmosphere, an inlet duct with a duct wall thereabout that is curved along its extent in extending from the air inlet along a curved path leading to the air compressor in that engine, and further comprises an inlet duct manifold positioned adjacent to the duct wall of the inlet duct on the air compressor side of a curve therein so as to permit drawing air therein that has previously entered the inlet duct and with the inlet duct manifold having an inlet air transfer duct extending therefrom that is coupled to the intermittent combustion engine air intake such air can be selectively drawn from the inlet duct into that intermittent combustion engine air intake, and further comprising an inlet control valve at least partially in the inlet air transfer duct which can be selectively directed to open more or close more to thereby selectively affect the passage of air through the inlet air duct.

6. The combination of claim 5 further comprising an intake control valve at least partially in the intermittent combustion engine air intake at a location therein such that the air intake couplings to the combustion chambers are between the intake control valve and where the inlet air transfer duct is coupled to the intermittent combustion engine air intake, the intake control valve also being coupled to the atmosphere and which can be selectively directed to open more or close more to thereby selectively affect the passage of air through the intermittent combustion engine air intake.

7. The combination of claim 5 further comprising an inlet blower at least partially in the inlet air transfer duct which can be selectively directed to blow more or less air to thereby selectively affect the passage of air through the inlet air duct.

8. The combination of claim 7 wherein a rotor with blades in the blower is mechanically coupled through a coupler to the intermittent combustion engine output shaft.

9. The combination of claim 8 further comprising a speed changing gear set in the coupler.

10. The combination of claim 9 further comprising a clutch as part of the coupler which can be selectively directed to engage or disengage to thereby selectively complete the coupling to cause the blower rotor to be rotated.

11. The combination of claim 7 further comprising an inlet control valve at least partially in the inlet air transfer duct which can be selectively directed to open more or close more to thereby selectively affect the passage of air through the inlet air duct.

12. The combination of claim 5 wherein a location on the duct wall portion covered by the inlet duct manifold, where a plane passing through the curved path to intersect the duct wall has the intersection with the largest local curvature, has a greater density of the perforations than does some other parts of the duct wall located farther from such a plane.

13. The combination of claim 5 wherein the inlet duct manifold is positioned against the duct wall of the inlet duct so as to cover a space against a portion of that wall so that structural openings extending from the interior of the inlet duct open into that space.

14. The combination of claim 1 wherein the intermittent combustion engine has an exhaust outlet coupled to the combustion chambers therein and further comprises an intermittent combustion engine exhaust turbine positioned at the exhaust outlet and a supply electrical generator having a rotatable input shaft mechanically coupled through a coupler to an intermittent combustion engine exhaust turbine output shaft, the supply electrical generator having an output conductor which is electrically energized in response to rotation of the input shaft thereof.

15. The combination of claim 1 further comprising a supplemental electrical generator having a rotatable input shaft coupled through a coupler to the turbine of the gas turbine engine, the supplemental electrical generator having an output conductor which is electrically energized in response to rotation of the input shaft thereof.

16. The combination of claim 15 further comprising a clutch as part of the coupler which can be selectively directed to engage or disengage to thereby selectively complete the coupling to cause the supplemental electrical generator input shaft to be rotated.

17. The combination of claim 1 further comprising the turbine starter/generator unit with the rotatable operation coupling shaft coupled through a coupler to the air compressor of the gas turbine engine such that the turbine starter/generator unit can be selectively directed to rotate a rotor in the air compressor or to have a rotor in the starter to be rotated by the air compressor to generate electrical power, and yet further comprising a clutch as part of the coupler which can be selectively directed to engage or disengage to thereby selectively complete the coupling to allow the turbine starter/generator unit to be selectively directed to rotate a rotor in the air compressor or to allow a rotor in the starter to be rotated by the air compressor.

18. The combination of claim 1 wherein the intermittent combustion engine is positioned at least in part forward of the gas turbine engine in an aircraft propelled by the gas turbine engine.

19. The combination of claim 1 wherein the engine combination is in an aircraft propelled by the gas turbine engine that is a turbofan engine.

20. The combination of claim 1 wherein the aircraft is an unmanned stealth type aircraft.

* * * * *